(No Model.)  2 Sheets—Sheet 1.

F. H. RICHARDS.
COTTON GIN.

No. 306,107. Patented Oct. 7, 1884.

Witnesses;
C. O. Palmer.
H. W. Faulkner.

Inventor;
Francis H. Richards.

(No Model.) 2 Sheets—Sheet 2.
F. H. RICHARDS.
COTTON GIN.
No. 306,107. Patented Oct. 7, 1884.
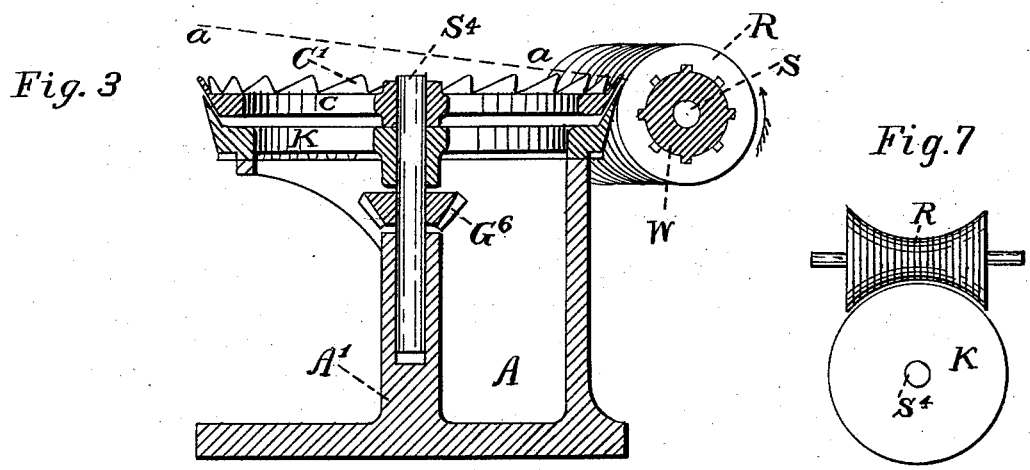
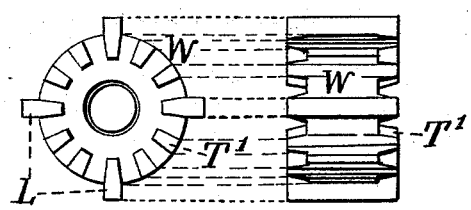
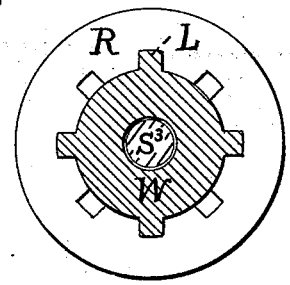
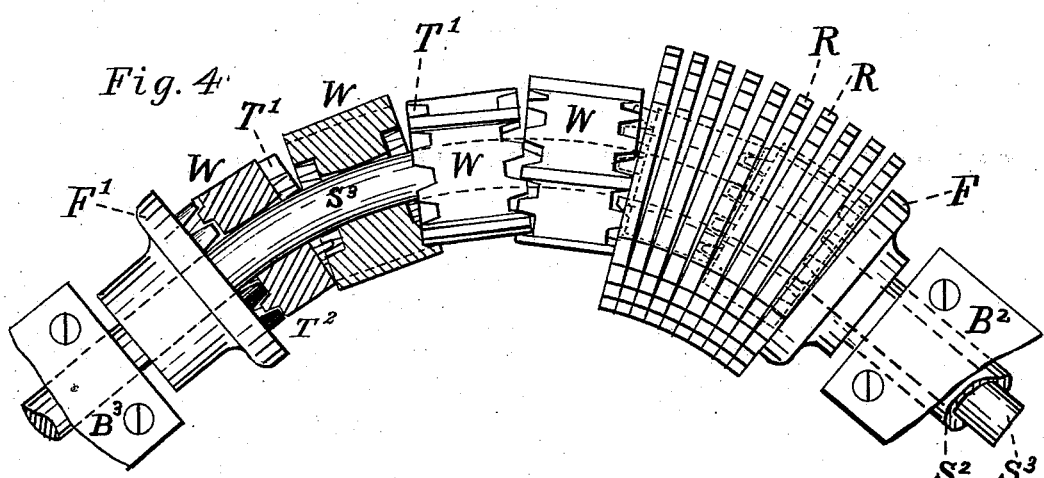
Witnesses:
C. O. Palmer.
H. W. Faulkner.
Inventor;
Francis H. Richards.

UNITED STATES PATENT OFFICE.

FRANCIS H. RICHARDS, OF SPRINGFIELD, MASSACHUSETTS.

COTTON-GIN.

SPECIFICATION forming part of Letters Patent No. 306,107, dated October 7, 1884.

Application filed January 14, 1884. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Cotton-Gins, of which the following is a specification, reference being had to the accompanying drawings, forming a part thereof.

My invention relates to that class of cotton-gins known as "roller-gins," and to that kind thereof having an endless seed-clearer adapted to be moved in a fixed circuit; and it consists in a new and improved friction-roll, and in a circular doctor-knife, and in combinations of mechanism hereinafter described and claimed.

Figure 1:
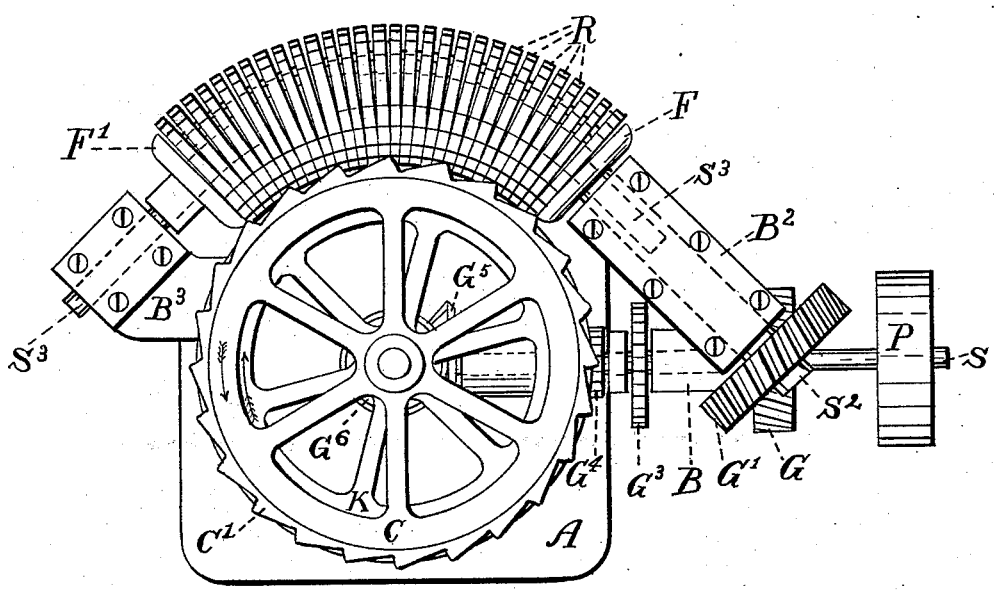
Figure 2:
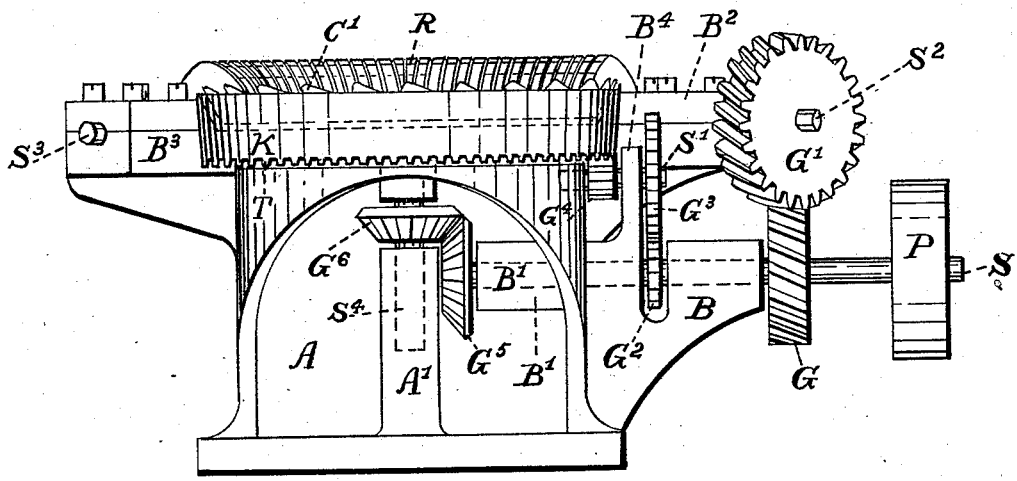

Referring to the drawings, Figure 1 is a plan view of a machine embodying my invention. Fig. 2 is a front elevation of the same. Fig. 3 is a vertical transverse section near the axis of the endless seed-clearer. Fig. 4 is an enlarged plan view, partially in section, of the friction-roll. Fig. 5 shows two views of one of the parts of that roll. Fig. 6 is an enlarged view of a part of Fig. 4. Fig. 7 is an explanatory figure, hereinafter described.

Similar letters refer to similar parts throughout the several views.

The machine-frame A, which is preferably formed integral, substantially as shown, has formed thereon or secured thereto suitable bearings for the operative parts of the machine. A part of this frame, A', has a bearing for a vertical shaft, $S^4$, which may act as a pivot, as herein shown, for an endless circular doctor-knife, K, and carries an endless circular seed-clearer, C, which is provided with a series of clearer-points, C', such as usually made on this class of seed-clearers. This shaft and the seed-clearer may be driven by means of the gears $G^6$ and $G^5$, a driving-shaft, S, supported in bearings B B', and driven by pulley P, or some equivalent mechanism. The doctor-knife K is rotated by means of gears $G^2$ and $G^3$, shaft S', and pinion $G^4$, gearing with cogs upon the doctor-knife. I prefer to make the seed-clearer and the doctor-knife of the cross-sectional form, substantially as shown in Fig. 3, but I do not limit myself thereto.

The doctor-knife, as herein shown, is constructed with a smooth upper edge and outside surface; but it may be made undulating, if desired.

I do not claim, broadly, herein an endless doctor-knife; but I have described and so claimed the same—but not the particular form thereof herein shown and claimed—in separate applications filed January 14, 1884, Serial Nos. 117,573 and 117,576, to which reference may be had.

It is obvious that the operation of the doctor-knife and seed-clearer, as hereinbefore described, is not dependent upon the particular form of friction-roll used in conjunction therewith, so long as this roll is made concave to conform to them. One form of roll adapted to be so used is illustrated by the sketch in Fig. 7, having a straight axis and being larger at the ends than in the middle.

I do not claim, broadly, herein such a concave roll, nor that particular form thereof shown in Fig. 7, but in a separate application, filed January 14, 1884, Serial No. 117,574, I have so claimed them.

In my present invention I use a new and improved friction-roll having a curved axis, and approximately a uniform diameter throughout its length. The axis of the roll is a curved shaft, $S^3$, which is rigidly fixed at one end in the bearing $B^3$, and supported at the other in a hole formed centrally in the shaft $S^2$. This latter shaft is carried in bearing $B^2$ and driven from shaft S by means of gears G and G', or their equivalent. Shaft S has a flange, F, having cogs $T^2$, the same as and adapted to mesh with the cogs T' of the roll-sections W. The first of these sections is close to the flange F, and driven directly therefrom, and each succeeding section of the series of sections is driven by the preceding one by similar or equivalent means.

Formed upon the roll-sections W is one or more suitable feathers, L, for driving a series of leather, rubber, or fibrous washers, R, composing the surface of the friction-roll. These are shown best in Figs. 5 and 6. The washers R, being of a uniform thickness and standing radially to the axis of the seed-clearer, (see Figs. 1 and 4,) are in close contact on their inner edges and at some distance from each other on their outer edges. At the opposite end of the roll from flange F is another similar flange, F', fitted to revolve freely about shaft $S^3$ against bearing $B^3$. These flanges are made nearly as large as the washers R, for the purpose of compressing the inner edges of the latter where they are in contact with the doctor-knife into a continuous friction-surface.

I do not limit myself to the shaft $S^3$ and sections W for carrying and operating the friction-roll; but I may use in place thereof any suitable flexible shaft—as, for instance, the one shown in United States Patent No. 130,253, granted to N. Stow, August 6, 1872.

The operation of my improved cotton-gin is in general the same as that of other roller-gins, but varies therefrom in certain particulars, which I will now describe. The clearer-points act upon the cotton-seeds to beat them off in the same manner as when they are formed upon flexible endless seed-clearers—as, for instance, upon such as shown in Letters Patent of the United States No. 185,452, to which reference may be had. The endless doctor-knife, by means of its motion longitudinally of the friction-roll, tends to turn over the seeds during the ginning operation, and thus enable the seed-clearer to beat them off with greater facility. The friction-roll acts against the doctor-knife and draws the fiber in between it and the doctor-knife in the usual manner, and in addition, owing to its peculiar construction, also seizes the fiber between the washers and forcibly draws the same downward and backward. When the seed-cotton is fed to the roll just above the doctor-knife, the washers R being then a small distance apart, some of the fibers enter the spaces between said washers, and following the motion of the roll down toward the knife are grasped between the said washers and drawn downward with a double force. This action of the friction-roll is obviously obtainable with any roll having its surface divided by incisions, either circular or spiral, and adapted to turn upon a curved axis. When this roll is made integral, the incision may be a helical one of suitable pitch, extending the entire length thereof; or the surface of said roll may be formed of a strip of suitable material wound spirally thereon.

A feed-board, which is not shown, is to be located as indicated by the dotted line $a$ $a$, Fig. 3, for convenience in handling the seed-cotton, of the usual or any suitable description.

Having thus described my invention, I claim—

1. In a cotton-gin, a friction-roll having a curved axis, substantially as described.

2. In a cotton-gin, a flexible friction-roll having a fixed curved central shaft, substantially as described.

3. In a cotton-gin, a friction-roll composed of a series of sections, W, washers R, and a fixed curved shaft, substantially as described.

4. In a cotton-gin, a curved fixed shaft, $S^3$, a driving-shaft, $S^2$, having a flange, F, a flange, F', and a roll, R, combined and operating substantially as described.

5. In a cotton-gin, a circular doctor-knife, substantially as described.

6. In a cotton-gin, a circular doctor-knife, a circular seed-clearer, and a curved friction-roll, combined and operating substantially as described.

FRANCIS H. RICHARDS.

Witnesses:
C. O. PALMER,
H. W. FAULKNER.